(12) United States Patent
Korin

(10) Patent No.: US 10,939,689 B2
(45) Date of Patent: Mar. 9, 2021

(54) APPARATUS FOR PREPARING COTTON CANDY WITH VERTICAL FEED

(71) Applicant: Mikhail Valerievich Korin, Moscow (RU)

(72) Inventor: Mikhail Valerievich Korin, Moscow (RU)

( * ) Notice: Subject to any disclaimer, the term of this patent is extended or adjusted under 35 U.S.C. 154(b) by 143 days.

(21) Appl. No.: 16/345,032

(22) PCT Filed: Dec. 15, 2016

(86) PCT No.: PCT/RU2016/000885
§ 371 (c)(1),
(2) Date: Apr. 25, 2019

(87) PCT Pub. No.: WO2018/111130
PCT Pub. Date: Jun. 21, 2018

(65) Prior Publication Data
US 2020/0253233 A1    Aug. 13, 2020

(51) Int. Cl.
*A23G 3/10*        (2006.01)

(52) U.S. Cl.
CPC ...................... *A23G 3/10* (2013.01)

(58) Field of Classification Search
CPC .......................................................... A23F 3/10
USPC ............................................................ 425/9
See application file for complete search history.

(56) References Cited

U.S. PATENT DOCUMENTS

| 5,145,687 A | 9/1992 | Parker |
| 6,116,880 A | 9/2000 | Bogue et al. |
| 2005/0011366 A1* | 1/2005 | Kowalski ................. A23G 3/10 99/331 |

FOREIGN PATENT DOCUMENTS

| RU | 111397 | 12/2011 |
| RU | 111397 U1 * | 12/2011 |

OTHER PUBLICATIONS

Machine translation of RU 111397 U1, Mikhail Valerievich Korin, Dec. 20, 2011 (Year: 2011).*

* cited by examiner

*Primary Examiner* — Joseph S Del Sole
*Assistant Examiner* — Lawrence D. Hohenbrink, Jr.
(74) *Attorney, Agent, or Firm* — Aleksandr Smushkovich

(57) ABSTRACT

The proposed apparatus relates to equipment for producing confectionery products and can be used at public catering and commercial enterprises for preparing candy floss. It includes a housing, a base with an electric motor having a shaft, a spinning head, a shell having a cover and propeller, and a diffusor secured on the base and having vertically bent vanes on its internal surface. The propeller is attached to the spinning head mounted on the shaft. The apparatus is equipped with rubberized supports for an extractor arranged on the housing. The diffusor has air intake openings in its lower part. The shell is made in the form of a ring having longitudinal slots. A spiral tubular heating element abuts the inside of the ring. The slots may repeat the shape of coils of the heating element. The proposed design makes it possible to considerably increase productivity of the apparatus.

13 Claims, 8 Drawing Sheets

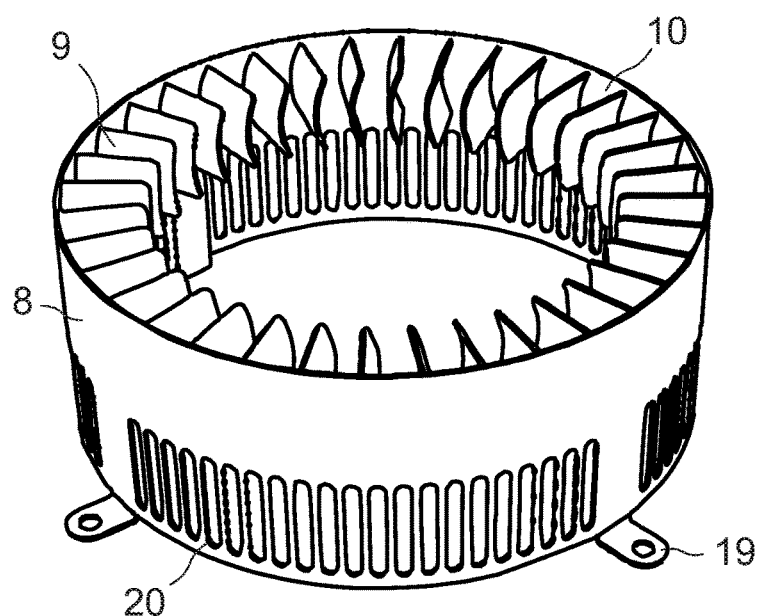
Fig. 6
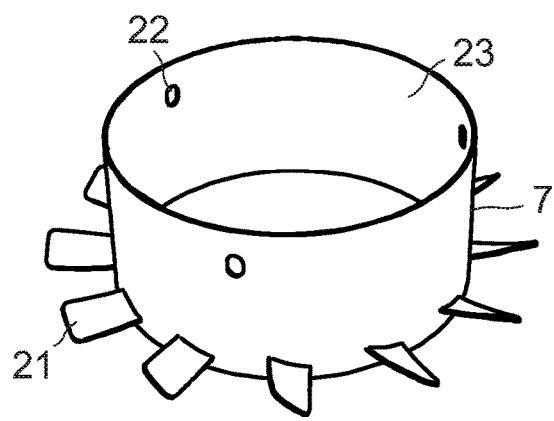 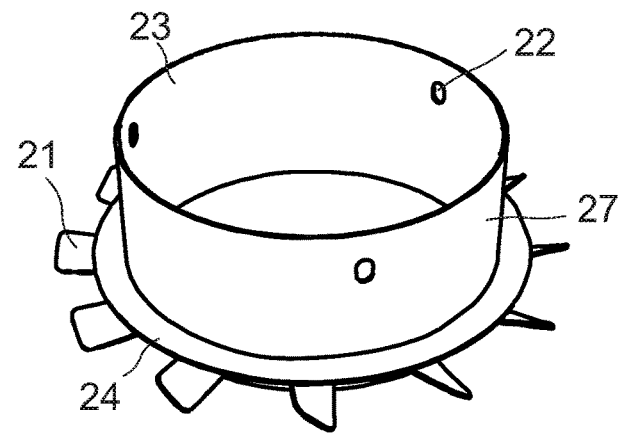
Fig. 7a
Fig. 7b

APPARATUS FOR PREPARING COTTON CANDY WITH VERTICAL FEED

CROSS-REFERENCE TO RELATED APPLICATIONS

This application is a U.S. national stage application of an international application PCT/RU2016/000885 filed on 15 Dec. 2016, whose disclosure is incorporated herein in its entirety by reference.

FIELD OF THE INVENTION

The invention relates to equipment for producing confectionery products and can be used at public catering and commercial enterprises, in particular for preparation of candy floss.

BACKGROUND OF THE INVENTION

There are known cotton candy machines that comprise housing, extractor, spinning head, heating element, propeller, shell (U.S. Pat. No. 4,872,821, 1989; U.S. Pat. No. 5,441,754, 1995; U.S. Pat. No. 5,766,643, 1998; RU 2083126 CI, 1997).

In all known machines candy floss leave the head through the shell sideward, to the walls of the extractor. Those machines have quite low productivity, because openings in the shell get clogged and need to be cleaned. Some machines have quite tedious procedure of disassembling and cleaning of machine's parts.

Besides that, the extractor gets fouled fast, because fair amount of candy floss is being stuck to the walls.

A cotton candy machine per patent RU 111397 U1, 29.07.2011 may be considered as the closest to the inventive apparatus disclosed herein.

The aforesaid machine comprises a housing with an extractor with a spinning head inside, including a shaft with a round shaped baseplate attached to its end, a cylindrical shell with parallel slots, a heating element arranged inside the shell, a shell cover, and radial tabs, whilst the heating element is a tubular heating spiral shaped heater consisting of a few coils arranged along the internal surface of the shell.

Design of the aforesaid spinning head allowed to slightly increase the duration of continuous machine operation between stopping for cleaning purposes, including cleaning of the heating element and the shell of stuck sugar mass. However, candy floss filaments used to stick to the shell's slots, tabs, and extractor's walls.

BRIEF SUMMARY OF THE INVENTION

The proposed invention allows to significantly increase productivity of the apparatus. The inventive apparatus for preparing candy floss comprises a housing, a base with an electric motor, a spinning head, a shell with a cover, a propeller, and a diffusor having blades bent in the vertical plane and arranged on the internal surface thereof.

The spinning head with the shell and the cover are mounted on the shaft of the electric motor.

The propeller is fastened to the spinning head, and the diffusor is secured on the base.

The shell, propeller and diffusor are made in a conical shape.

The apparatus is additionally equipped with rubberized supports for the extractor arranged on the housing.

In the lower part of the diffusor there are air intake openings.

The width of the air intake openings is preferably 5-6 mm. The propeller may have between 2 to 12 blades. The propeller may have an extra ring.

The shell is preferably made as a 1-2 mm thick steel ring, with longitudinal slots.

The spiral tubular heating element abuts to the inside of the ring.

The slots in the ring may repeat the shape of the spiral heating element.

The ring and the spiral heating element are preferably made of stainless steel.

DESCRIPTION OF DRAWINGS OF THE INVENTION

Design of the inventive apparatus is explained by the attached drawings wherein:

FIG. 6 depicts the diffusor in a perspective view.

FIG. 7a depicts the propeller (without an extra ring) in a perspective view.

FIG. 7b depicts the propeller (with an extra ring) in a perspective view.

DESCRIPTION OF PREFERRED EMBODIMENTS OF THE INVENTION

Figure 1:
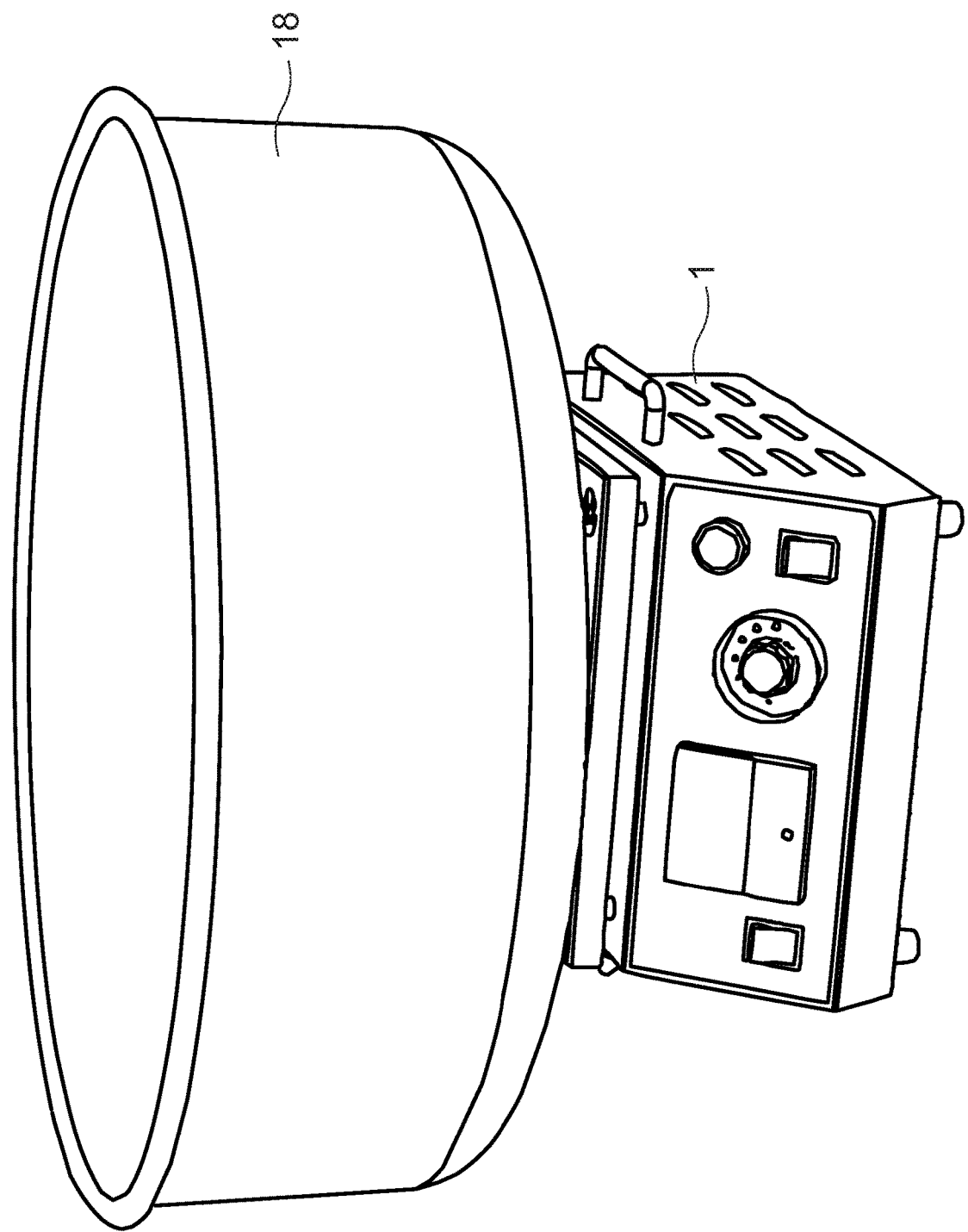
FIG. 1 depicts general appearance of the apparatus with an extractor.
Figure 2:
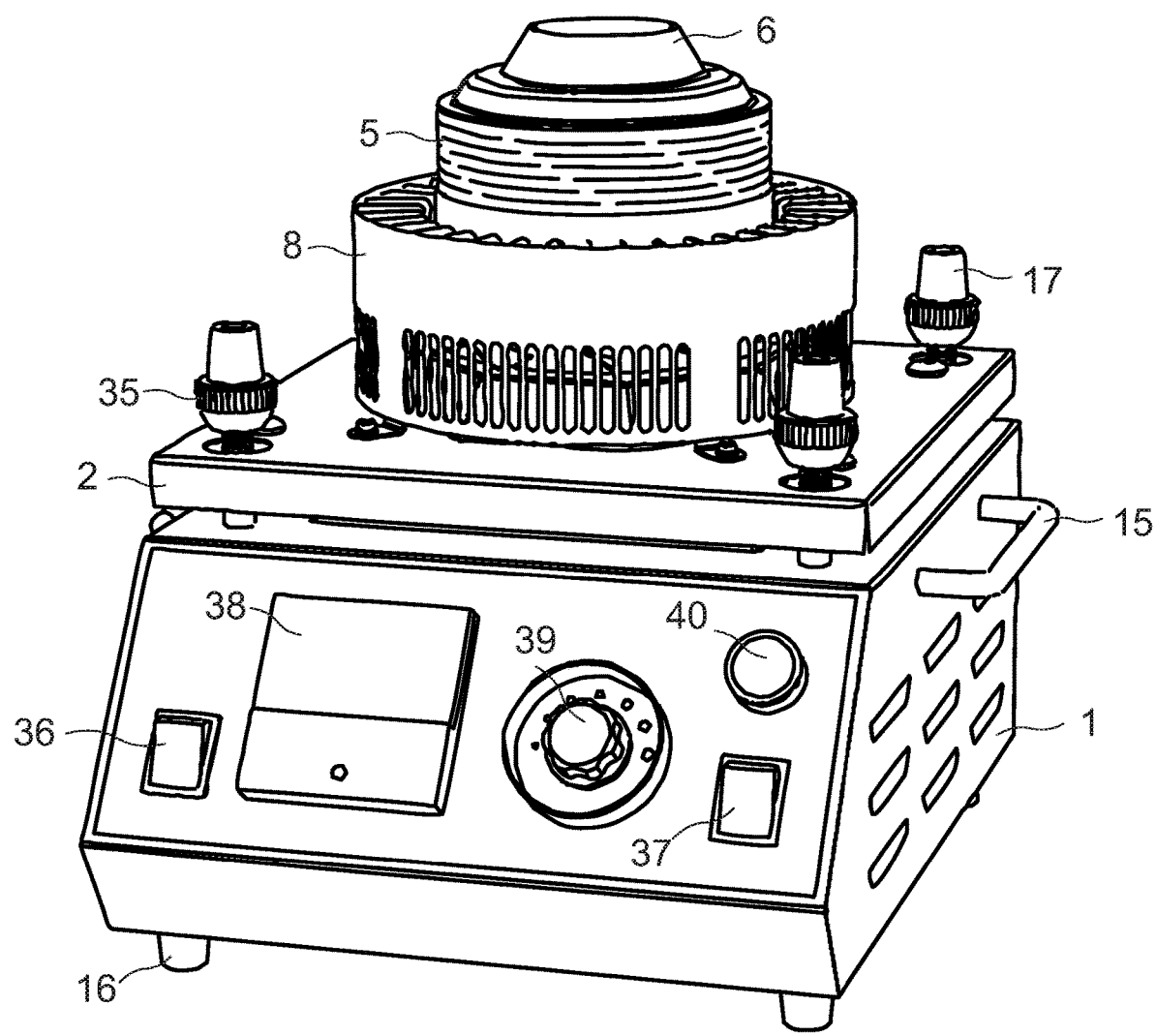
FIG. 2 depicts general appearance of the apparatus without an extractor.
Figure 3:
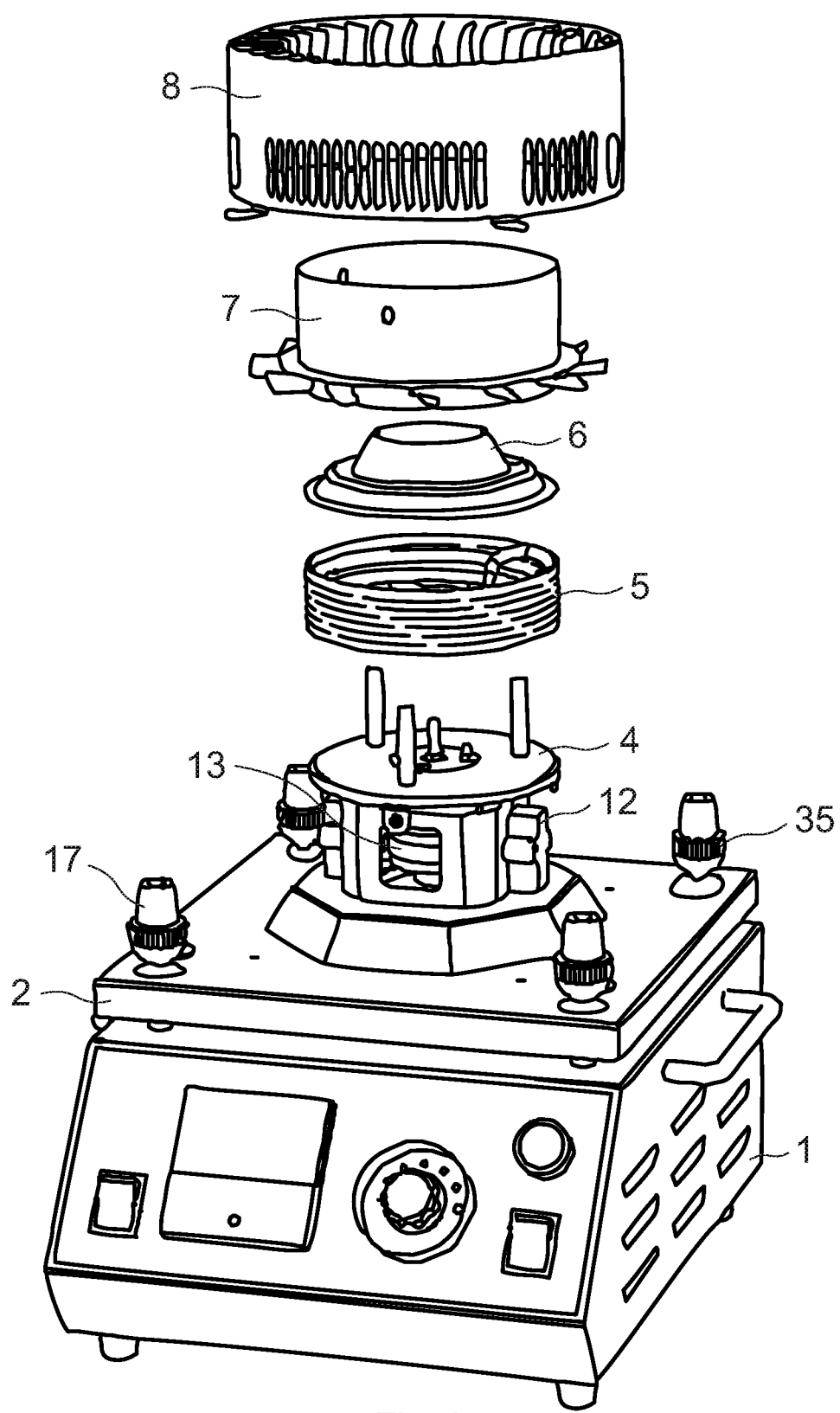
FIG. 3 depicts the apparatus in an exploded view.
Figure 4:
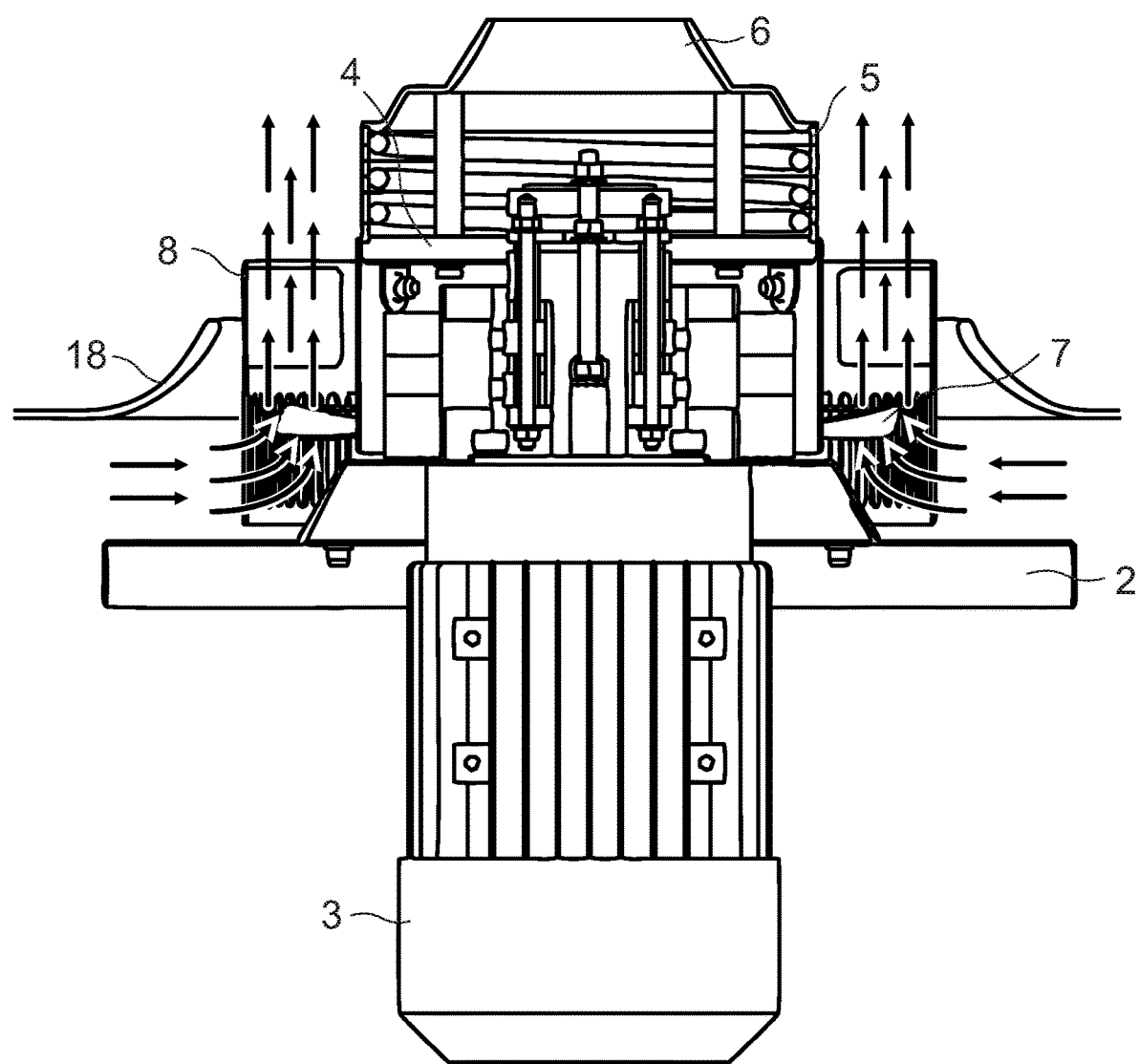
FIG. 4 depicts the movement of air flow on a sectional view of the apparatus with the extractor.
Figure 5:
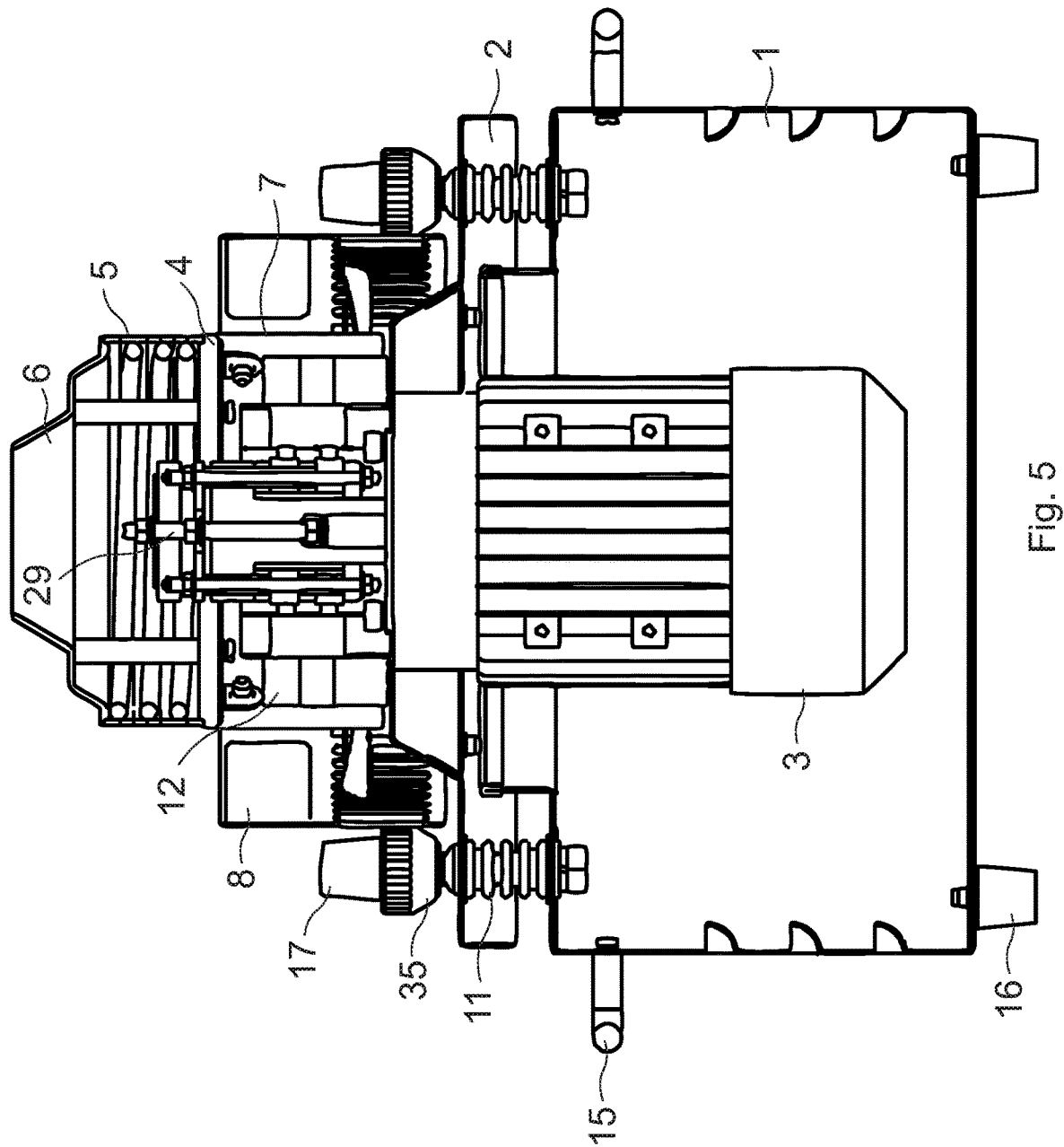
FIG. 5 depicts a sectional view of the apparatus without the extractor.
Figure 8:
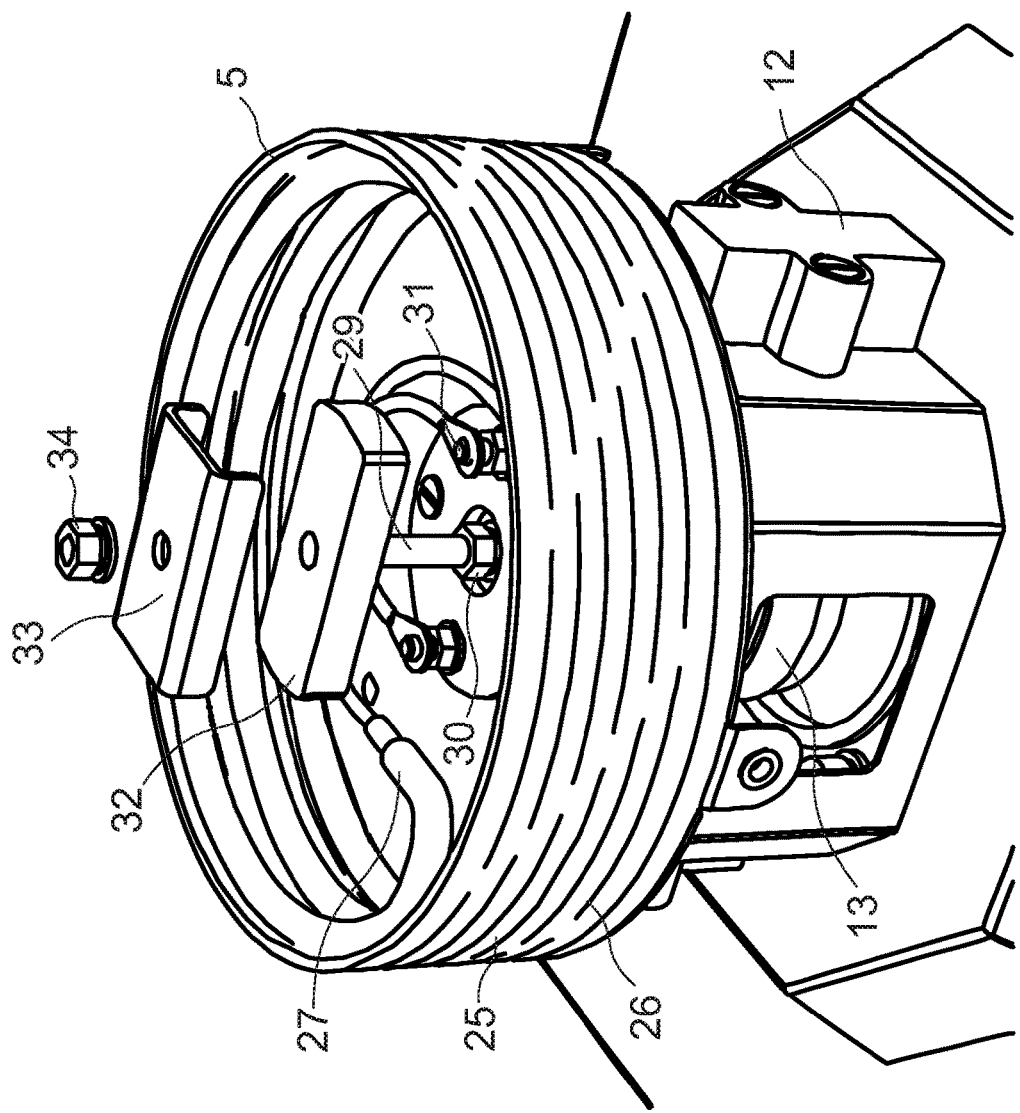
FIG. 8 depicts dismantling process of the shell with the heating element in a perspective view.
Figure 9:
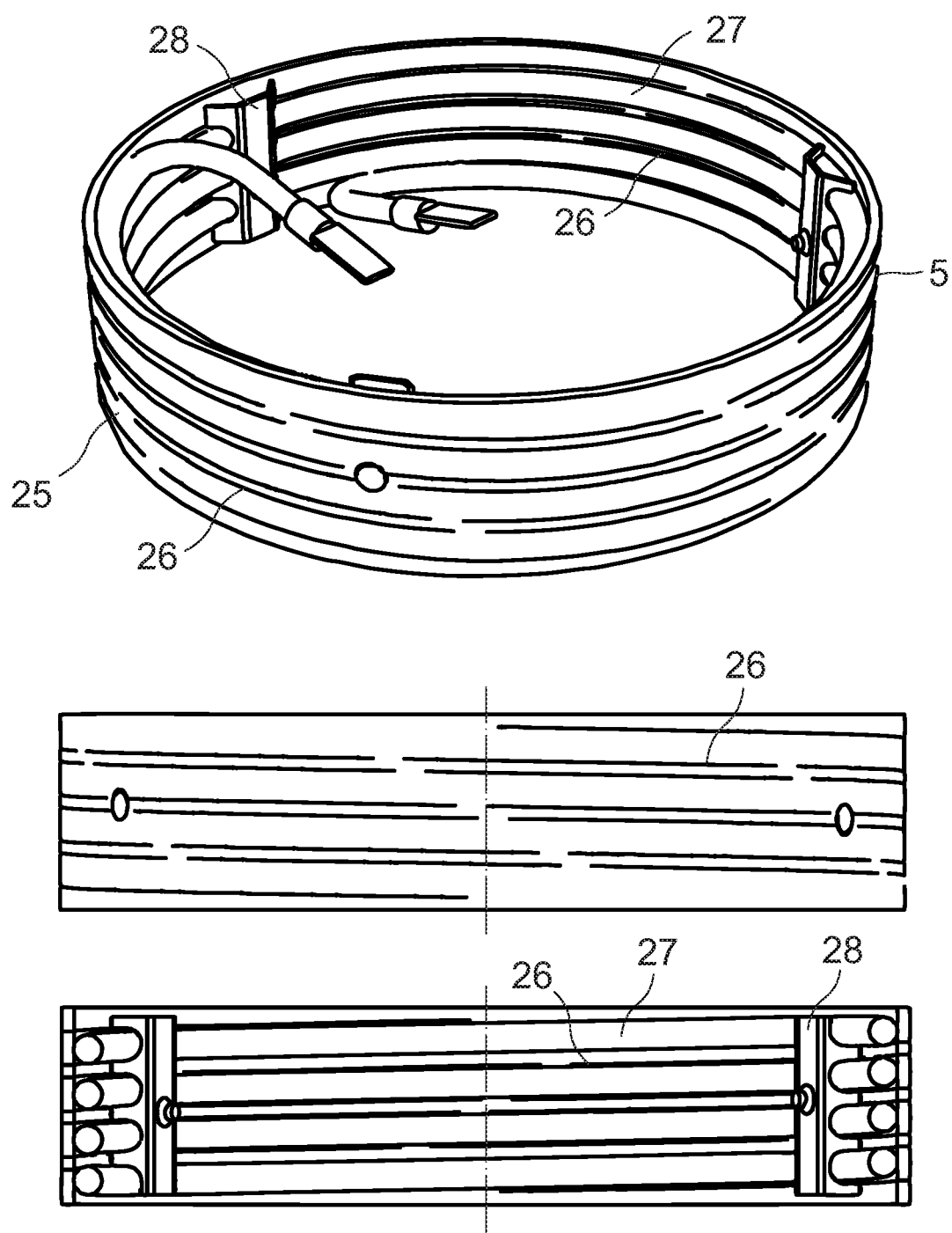
FIG. 9 depicts the shell with the spiral slots repeating the heating element shape, in a perspective view, frontal view and sectional frontal view.

The apparatus for preparing candy floss comprises: a housing 1, a base 2 with an electric motor 3, a spinning head 4, a shell 5 with a cover 6, a propeller 7, and a diffusor 8 with vanes 9, bent in a vertical plane and arranged on the internal surface 10 thereof.

The spinning head 4 with the shell 4 and the cover 6 is mounted on the shaft of the electric motor 3.

The housing 1 of apparatus has spring supports 11, which the base 2 is mounted on.

The shaft of the electric motor spins with a rate of 2700-3600 rpm.

Electric energy is delivered to the spinning head 4 via brushes 12 mounted on the base 2, then to a copper slip rings 13, and then through current-carrying studs 31 and finally to a heating element of the shell 5.

The apparatus has carrying handles 15, and rubberized supports 16 mounted on the apparatus, which reduce vibrations passed from the base 2.

Rubberized supports 17 for an extractor 18 are mounted on the housing 1.

The extractor 18 is intended to prevent sugar particles flying out in all directions from the spinning head 4.

The propeller 7, having a number of blades 21, is mounted on the spinning head 4, and rotates along with the spinning head 4, creating airflow.

The diffusor 8 is mounted on the base 2, fixed with fasteners through holes 19.

The lower part of the cylindrical diffusor 8 has air intake openings 20, through which air intake happens.

The openings 20 have a width preferably of 5-6 mm. This width prevents large insects, e.g. wasps, to be sucked along with the air, and also prevents operator's fingers injury.

The vanes 9 are mounted on the housing of the diffusor 8 preferably having a cylindrical shape.

The number of the vanes 9 is chosen in such a way that to avoid operator's fingers contact with the propeller 7 rotating at a high speed.

The vanes 9 have a curved shape (the vanes are bent in the vertical plane), so that the air stream, created by the blades 21 of the propeller 7, is not twisted, but moves upwards as a laminar flow.

This factor is essential to avoid candy floss filaments to be twisted as they're cooling down, but instead of that to let it move upwards as a straight column, consequently increasing the productivity of the apparatus.

The proposed design of the apparatus allows to lift a so called vertical column of candy floss filaments up to 1 meter height, and to wind candy floss servings of a virtually unlimited diameter.

Having a stable vertical candy floss column over the apparatus allows for pulling it in such a way that it is possible to wind candy floss at a considerable distance from the apparatus (2 meters and more).

At the same time, the productivity remains quite high.

The blades 21 are mounted on a housing 23 of the propeller 7 preferably having a cylindrical shape. The number of the blades 21 may preferably be chosen between 2 to 12.

The shape and number of the blades 21 are chosen in such a way that to be enough for creating airstream that lifts candy floss upwards.

Holes 22 on the housing 23 of the propeller 7 are provided for fastening it to the spinning head 4.

For air stream shaping, it may be required to install an extra ring 24 on the housing 23 of the propeller 7.

This ring 24 reduces the air stream and heads it to some distance from the shell 5.

The shell 5 has a design different from similar units in the aforementioned prior art patents.

The shell 5 comprises a steel ring 25 preferably 1-2 mm thick, preferably made of stainless steel, because after operation, the ring is cleaned in water.

Thick ring 25 is essential to accumulate more heat and increase the passage length for melted sugar.

The ring 25 has a number of longitudinal slots 26 having a preferable width of 0.1-0.5 mm vertically spaced by intervals of preferably 3-8 mm.

A spiral tubular heating element 27, made of stainless steel as well, abuts to the internal surface of the ring 25.

The gaps between coils of the heating element 27 must not exceed 5-6 mm.

Too large gaps between the coils will result in that sugar won't have enough time to be warmed up in this area. As a result, the surface of the shell 5 would be used inefficiently.

To fix the gap between the coils of the heating element 27, bars 28 may be used.

At the same time, the slots 26 in the ring 25 may repeat the shape of heating element 27.

This won't allow sugar to be clumped in hidden areas, and will enhance effective surface of the shell, thus increasing productivity of the inventive apparatus.

During the operation, melted sugar flies out through the slots 26 of the steel ring 25 (the shell 5), due to the centrifugal force that is created as a result of rotation of the electric motor 3 and the spinning head 4.

Created air stream takes melted sugar vertically upwards, crystallized sugar forms thin filaments that looks like cotton.

A vertical air stream is created by rotation of the propeller 7; the diffusor 8 makes possible the air intake and guides it upwards.

Heavy sugar particles (negligible amount) that are not carried by the air stream, settle down on the internal surface of cylindrical pan—the extractor 18.

Besides that, the ability to quickly replace certain parts of the apparatus is very important to avoid productivity loss.

For example, to facilitate disassembling procedure of the spinning head 4, it is proposed to fasten the spinning head 4, as a whole, on a stud 29 projecting from the shaft of the electric motor 3.

Fixation to the shaft is provided by a nut 30.

Contacts of the heating element 27 are pressed to current-carrying studs 31 with a washer 32 made of heat-resistant plastic.

A clamping channel 33 preferably made of steel and a nut 34 are mounted above the washer 32.

The whole structure is mounted onto the stud 29, thus, while doing technical maintenance, it is enough to take off the cover 6 and unscrew only one fixing nut 34 to take down the shell 5 with the heating element 27.

To avoid damage of the moving parts during transportation, four fastening nuts 35, arranged on the supports 17 of the extractor 18, are provided. The nuts 35 are made as threaded studs with coarse threads.

The nuts 35 are preferably made of hard plastic, in order to avoid damage of the paintwork of the base 2.

While the nuts 35 are tightened, the spring supports 11 are depressed, and the base 2 is pressed down to the housing 1, blocking moving parts in transportation position.

Electric part of the apparatus operates as follows.

Upon pressing a "Motor" switch 36, the electric motor 3 is turned on.

The electric motor 3 may be designed asynchronous and three phase, in which case it can be connected to a single phase via an electric capacitor with proper capacitance.

To start heating up the shell 5, a "Heating" switch 37 must be pressed.

Electric current flows through a power control unit to a voltmeter 38 and via the brushes 12 to the heating element 27.

At the same time, the above described electric circuit is designed in such a way that with the electric motor 3 being turned off (by the "Motor" switch 36), it is possible to apply voltage onto the heating element 27 directly, bypassing the power control unit, by pressing and holding a "Fast Start" push button 40. This provides fast heating up of the shell 5, even with the electric motor 3 being turned off.

Since the "Fast Start" button 40 should be continuously pressed, the operator becomes more vigilant, which excludes overheating the shell 5.

The fast warming up feature allows for heating up the shell and obtain ready-to-eat candy floss in only 30 seconds after operation is started, which increases the productivity as well.

Pressing and holding the "Fast Start" button allows bypassing the protection of the apparatus, and provides the shell 5 with full power even with the electric motor being turned off.

Since the "Fast Start" button is non-locking, and the heating process is carried out only if the button is kept pressed by the operator, overheating the shell and damaging the heating element 27 are excluded, because the operator must be next to the apparatus and watch the process.

The power control unit is required for changing intensity of the heating of the shell 5, indirectly controlling temperature on the shell's surface.

The temperature on the surface is an important factor, because it affects quality of candy floss in changeable surrounding conditions.

For stable operation of the apparatus, the temperature on the surface of the shell 5 must be between 120 to 140° C.

An adjustment knob 39 of the power control unit is located on the control panel of the housing 1 of the apparatus. A pointer or digital type voltmeter 38 provided on the control panel allows to visually control the heating intensity level of the shell 5.

In the control circuit, an electromagnetic interference suppression filter may be provided. It is required for reducing interferences coming from the power control unit to the power grid, since most power control units are based on the principles of PWM (Pulse Width Modulation).

To avoid short circuit in case of any fault component in the apparatus, a fuse may be provided in the control circuit.

The proposed invention allows to significantly increase productivity of the apparatus for preparing cotton candy.

The invention claimed is:

1. An apparatus for preparing candy floss comprising a housing, a base with an electric motor having a shaft, a spinning head, a shell with a cover, a propeller and a diffusor having a number of vanes bent in a vertical plane and arranged on an internal surface thereof, wherein the spinning head with the shell and the cover are mounted on the shaft, the propeller is fastened to the spinning head, and the diffusor is secured on the base.

2. The apparatus according to claim 1, further comprising an extractor mounted on the housing; and said extractor has rubberized supports.

3. The apparatus according to claim 1, wherein a number of air intake openings are arranged in a lower part of the diffusor.

4. The apparatus according to claim 3, wherein a width of the air intake openings is 5-6 mm.

5. The apparatus according to claim 1, wherein the propeller has between 2 to 12 blades.

6. The apparatus according to claim 1, wherein the propeller has an extra ring.

7. The apparatus according to claim 1, wherein said shell further includes a heating element, a power control unit, a first electric circuit and a second electric circuit parallel to the first electric circuit; wherein the first electric circuit and the second electric circuit are capable of switching therebetween by a motor switch set either in an ON position or in an OFF position; wherein (a) the first electric circuit, including the electric motor and the power control unit, operates when the motor switch is set in the ON position and the electric motor rotates, and (b) the second electric circuit including a fast start push button, bypassing the electric motor and the power control unit, operates when the motor switch is set in the OFF position and the electric motor does not rotate, thereby providing heating of the heating element.

8. The apparatus according to claim 1, wherein the shell, the propeller and the diffusor are made in a conical shape.

9. The apparatus according to claim 1, wherein the shell is made as a ring with longitudinal slots, and the heating element is made in a spiral tubular shape, abutting the inside of the ring.

10. The apparatus according to claim 9, wherein a thickness of the ring is 1-2 mm.

11. The apparatus according to claim 9, wherein the ring is made of stainless steel.

12. The apparatus according to claim 9, wherein the heating element is made of stainless steel.

13. The apparatus according to claim 9, wherein the ring further includes a number of slots, and the shape of the slots repeats the shape of the heating element.

\* \* \* \* \*